United States Patent [19]
Rolf et al.

[11] Patent Number: 5,194,626
[45] Date of Patent: Mar. 16, 1993

[54] METAL COMPLEX PIGMENTS OF AZINES

[75] Inventors: Meinhard Rolf, Leverkuen; Bernd Kaletta, Leverkusen, both of Fed. Rep. of Germany

[73] Assignee: Bayer Aktiengesellschaft, Leverkusen, Fed. Rep. of Germany

[21] Appl. No.: 824,760

[22] Filed: Jan. 17, 1992

Related U.S. Application Data

[63] Continuation of Ser. No. 367,398, Jun. 16, 1989, abandoned.

[30] Foreign Application Priority Data

Jul. 2, 1988 [DE] Fed. Rep. of Germany ....... 3822491
Jul. 19, 1988 [DE] Fed. Rep. of Germany ....... 3824454

[51] Int. Cl.⁵ .......................... C07B 26/02; C07D 7/12
[52] U.S. Cl. .................................... 548/402; 548/403; 548/101; 548/105; 106/287.18; 546/6
[58] Field of Search ............... 548/101, 402, 403

[56] References Cited

U.S. PATENT DOCUMENTS

| | | | |
|---|---|---|---|
| 4,237,293 | 12/1980 | L'Eplattenier et al. | 548/106 |
| 4,349,671 | 9/1982 | Iqbal et al. | 548/106 |
| 4,614,547 | 9/1986 | Neeff et al. | 106/288 |
| 4,628,093 | 12/1986 | Neeff et al. | 546/6 |

FOREIGN PATENT DOCUMENTS 1535877 12/1978 United Kingdom .

*Primary Examiner*—Nicholas S. Rizzo
*Attorney, Agent, or Firm*—Sprung Horn Kramer & Woods

[57] ABSTRACT

Metal complexes of azines of the formula

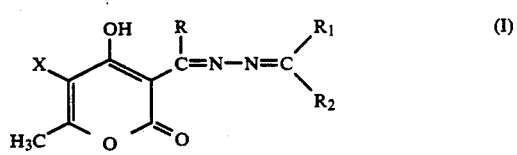

in which
X denotes hydrogen or halogen,
R denotes hydrogen or an organic radical,
$R_1$ denotes hydrogen or an organic radical,
$R_2$ denotes an organic radical, in which $R_1$ and $R_2$ together with the C atom linking them can also form a carbocyclic or heterocyclic ring or a carbocyclic or heterocyclic ring system in which the rings and ring systems mentioned can also be substituted, and one of the radicals $R_1$, $R_2$ or $R_1$ and $R_2$ together contain a group capable of forming a metal salt, and processes for pigmenting using these metal complexes.

6 Claims, No Drawings

METAL COMPLEX PIGMENTS OF AZINES

This application is a continuation of application Ser. No. 367,398, filed Jun. 16, 1989, now abandoned.

The invention relates to metal complexes of azines of the formula

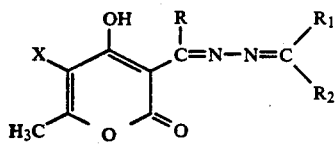 (I)

processes for their preparation and processes for pigmenting.

In formula (I),

X denotes hydrogen or halogen,

R denotes hydrogen or an organic radical, $R_1$ denotes hydrogen or an organic radical, $R_2$ denotes an organic radical, in which $R_1$ and $R_2$ together with the C atom linking them can also form a carbocyclic or heterocyclic ring or a carbocyclic or heterocyclic ring system in which the rings and ring systems mentioned can also be substituted, and one of the radicals $R_1$, $R_2$ or $R_1$ and $R_2$ together contain a group capable of forming a metal salt.

Metal complexes which have one of the following structural features are preferred:

1. Metal complexes containing divalent metals, for example Zn, Cd, Mn, Co, Fe and in particular Ni and Cu.
2. 1:1 metal complexes.
3. Metal complexes of azines of the formula I in which X is H.
4. Metal complexes of azines of the formula I in which R is H, $CH_3$.
5. Metal complexes of azines of the formula I in which

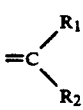

represents the radical of a 5- or 6-membered ring which contains 1 or 2 heteroatoms from the series consisting of N, O, S, can be substituted, and has a group capable of forming a metal salt, and onto which a substituted or unsubstituted carbocyclic or a substituted or unsubstituted heterocyclic ring, for example a benzo or cyclohexylene radical, or the radical of a ring containing one or two heteroatoms from the series consisting of N, O, S can be fused.

6. Metal complexes of azines of the formula I in which the group in $R_1$ or $R_2$ which is capable of forming a metal salt is in the 2-position with respect to the azine grouping, which is in the 1-position.

7. Metal complexes of azines of the formula I in which

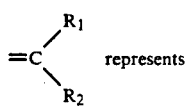 represents 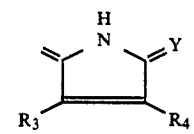 (II)

in which

Y represents the divalent radical of a compound having two exchangeable hydrogen atoms on a C or N atom, in particular the divalent radical of an active methylene compound, an amine, hydrazine, hydrazide or hydrazone and $R_3$, $R_4$ signify H or organic radicals, in which $R_3$ and $R_4$ together can also form, signify a fused-on carbocyclic or heterocyclic ring or a carbocyclic or heterocyclic ring system in which the rings and ring systems mentioned can be substituted.

8. Metal complexes of azines of the formula I in which

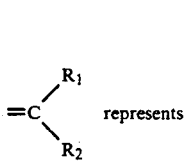 represents 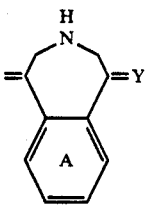

in which Y has the meaning given in formula II and ring A can carry 1-4 substituents.

9. Metal complexes of azines of the formula I in which

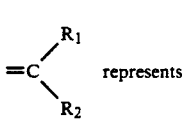 represents 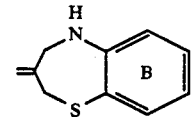

in which the ring designated as B can carry 1-4 substituents.

10. Metal complexes of azines of the formula I in which

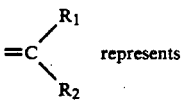 represents 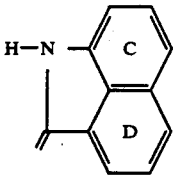

in which the rings designated as C and D can have 1-6 substituents.

The combination of various of these structural features leads to particularly preferred metal complexes. Examples are the following combinations:

1.2.; 1.3.; 1.4.; 1.5.; 1.6.; 1.7.; 1.8.; 1.9.; 2.3.; 2.4.; 2.5.; 2.6.; 2.7.; 2.8.; 2.9.; 3.4.; 3.5.; 3.6.; 3.7.; 3.8.; 3.9.; 4.5.; 4.6.; 4.7.; 4.8.; 4.9.; 1.2.3.; 1.2.4.; 1.2.5.; 1.2.6.; 1.3.4.; 1.3.5.; 1.3.6.; 1.4.5.; 1.4.6.; 1.5.6.; 2.3.4.; 2.3.5.; 2.3.6.; 2.4.5.; 2.4.6.; 2.5.6.; 3.4.5.; 3.4.6.; 3.5.6.; 1.2.7.; 1.3.7.; 1.4.7.; 1.6.7.; 2.3.7.; 2.4.7.; 2.6.7.; 3.4.7.; 3.6.7.; 1.2.8.;

```
1.3.8.; 1.4.8.; 1.6.8.; 2.3.8.; 2.4.8.; 2.6.8.; 3.4.8.;
3.6.8.; 1.2.9.; 1.3.9.; 1.4.9.; 1.6.9.; 2.3.9.; 2.4.9.;
2.6.9.; 3.4.9.; 3.6.9.; 1.2.10.; 1.3.10; 1.4.10;
1.6.10.; 2.3.10; 2.4.10; 2.6.10; 3.4.10.; 3.6.10.
``` and combinations consisting of four, five or six of the structural features 1., 2., 3., 4., 5., 6.; 1., 2.,3., 4., 6., 7.; 1., 2., 3., 4., 6., 8.; 1., 2., 3., 4., 6., 9. and 1., 2., 3., 4., 6., 10.

The organic radicals R, $R_1$, $R_2$, $R_3$, $R_4$ are preferably alkyl, cycloalkyl, aryl, aralkyl or heterocyclic radicals, in which the radicals listed can be substituted.

Alkyl represents in particular $C_1$–$C_6$-alkyl, for example methyl, ethyl, n- and i-propyl, i- and t-butyl.

Cycloalkyl represents in particular mono-, bi- and tricyclic cycloalkyl having 3–10, in particular 3, 5 or 6 C atoms. Examples are: cyclopropyl, cyclobutyl, cyclopentyl, cyclohexyl, cycloheptyl, bicyclo[2.2.1]heptyl, bicyclo[2.2.2]octyl, and adamantyl.

Aryl preferably represents phenyl and naphthyl.

Aralkyl preferably represents phenyl-$C_1$–$C_4$-alkyl and naphthyl-$C_1$$C_4$-alkyl, for example benzyl and phenethyl.

Heterocyclic radicals are in particular heteroparaffinic, heteroaromatic and heteroolefinic 5- to 7-membered, preferably 5- or 6-membered rings preferably having 1 to 3, in particular 1 or 2 identical or different heteroatoms. The heteroatoms are oxygen, sulphur or nitrogen. Examples are pyrrolidinyl, piperidinyl, furyl, thiophenyl, pyrazolyl, imidazolyl, 1,2,3- and 1,2,4-triazolyl, oxazolyl, isoxazolyl, thiazolyl, isothiazolyl, 1,2,3-, 1,3,4-, 1,2,4- and 1,2,5-oxadiazolyl, azepinyl, pyrrolyl, isopyrrolyl, pyridyl, piperazinyl, pyridazinyl, pyrimidinyl, pyrazinyl, 1,3,5-, 1,2,4- and 1,2,3-triazinyl, 1,2,4-, 1,3,2-, 1,3,6- and 1,2,6-oxazinyl, oxepinyl, thiepinyl and 1,2,4-diazepinyl.

The alkyl, cycloalkyl, aryl, aralkyl and heterocyclic radicals R, $R_1$, $R_2$, $R_3$,$R_4$ and the rings A, B, C and D and the carbocyclic or heterocyclic rings or carbocyclic or heterocyclic ring systems which are formed by $R_1$ and $R_2$ together with the C atom linking them can be substituted, for example by alkyl having preferably 1 to 4, in particular 1 or 2 carbon atoms, such as methyl, ethyl, n- and i-propyl and n-, i- and t-butyl; alkoxy preferably having 1 to 4, in particular 1 or 2 carbon atoms, such as methoxy, ethoxy, n- and i-propyloxy and n-, i- and t-butyloxy; alkylthio preferably having 1 to 4, in particular 1 or 2 carbon atoms, such as methylthio, ethylthio, n- and i-propylthio and n-, i- and t-butylthio; halogenoalkyl preferably having 1 to 4, in particular 1 or 2 carbon atoms and preferably 1 to 5, in particular 1 to 3 halogen atoms, in which the halogen atoms are identical or different and the halogen atoms are preferably fluorine, chlorine or bromine, in particular fluorine, such as trifluoromethyl; hydroxy; halogen, preferably fluorine, chlorine, bromine and iodine, in particular chlorine and bromine; cyano; nitro; amino; monoalkylamino and dialkylamino preferably having 1 to 4, in particular 1 or 2, carbon atoms per alkyl group, such as methylamino, methylethylamino, n- and i-propylamino and methyl-n-butylamino; carboxyl; carbalkoxy preferably having 2 to 4, in particular 2 or 3, carbon atoms, such as carbomethoxy and carboethoxy; sulpho(—$SO_3H$); alkylsulphonyl preferably having 1 to 4, in particular 1 or 2, carbon atoms, such as methylsulphonyl and ethylsulphonyl; arylsulphonyl preferably having 6 or 10 aryl carbon atoms, such as phenylsulphonyl.

The group which is present in $R_1$ and/or $R_2$ and is of forming a metal salt is preferably —OH, —SH, —NH, —COOH or —$SO_3H$.

Halogen X represents in particular F, Cl, Br.

The radical Y in formulae (II) and (III) can, for example, be derived from an active methylene compound of the formula (IV)

$$CNCH_2R^6 \qquad (IV)$$

in which $R^6$ has the following meaning: cyano, $C_1$–$C_6$-alkoxycarbonyl; $C_1$–$C_6$-alkylcarbonyl, in particular acetyl; substituted or unsubstituted benzoyl; substituted or unsubstituted phenoxycarbonyl; substituted or unsubstituted phenyl.

Suitable substituents in benzoyl, phenoxycarbonyl and phenyl are 1–4 substituents from the series consisting of chlorine, bromine, nitro, cyano, acetylamino, chlorine- or nitro-substituted benzoylamino, carbamoyl, N-methylcarbamoyl, chlorine- or nitro-substituted N-phenylcarbamoyl, phthalimidyl or tetrachlorophthalimidyl.

$R^6$ can furthermore represent a heterocyclic radical of the formula (V)

in which

A represents the remaining members of a 5- or 6-membered ring, which may contain further heteroatoms and be fused. Examples of heterocyclic radicals $R^6$ are

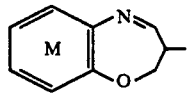 (VI)

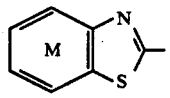 (VII)

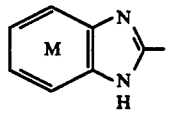 (VIII)

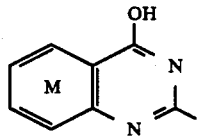 (IX)

The rings designated as M in formulae (VI) to (IX) can be substituted, for example by halogen, preferably chlorine and bromine; nitro; $C_1$–$C_6$-alkyl, preferably methyl and ethyl; $C_1$–$C_6$-alkoxy, preferably methyl and ethoxy.

$R^6$ preferably represents a carbamoyl radical of the formula (X)

—CO—NH—R⁷     (X)

in which

R⁷ denotes hydrogen; $C_1$–$C_4$-alkyl, in particular methyl; substituted or unsubstituted phenyl or naphthyl or a radical of the formulae (VI) to (IX).

Suitable substituents of the phenyl or naphthyl radicals are 1–5 substituents from the series consisting of halogen, in particular chlorine or bromine; nitro; $C_1$–$C_6$-alkyl, in particular methyl; $C_1$–$C_6$-alkoxy, in particular methoxy or ethoxy; carbamoyl; N-alkylcarbamoyl, in particular N-methylcarbamoyl; N-phenylcarbamoyl, in which phenyl can be substituted, for example by chlorine, bromine, nitro, fluorine, methyl, ethyl, methoxy, ethoxy, phthalimidyl, tetrachlorophthalimidyl, $C_1$–$C_4$-acylamino, optionally further substituted benzoylamino or a radical of the formulae (VI) to (IX); $C_1$–$C_4$-acylamino, in particular acetylamino and formamido; phthalimidyl; tetrachlorophthalimidyl; aroylamino, in particular benzoylamino, in which benzoylamino can be further substituted in the phenyl ring, for example by chlorine, bromine, nitro, fluorine, methyl, ethyl, methoxy, ethoxy, phthalimidyl, tetrachlorophthalimidyl, $C_1$–$C_4$-acylamino, optionally further substituted benzoylamino or a radical of the formulae (VI) to (IX); $C_1$–$C_4$-alkylsulphoxyl, in particular methylsulphonyl.

The radical Y in formulae (II) and (III) can furthermore be derived from active methylene cyclic compounds, for example of the following formulae:

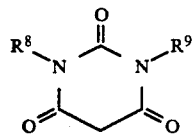
(X)

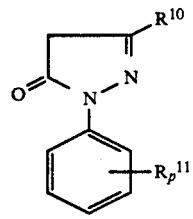
(XI)

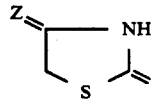
(XII)

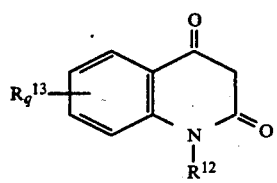
(XIII)

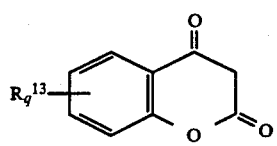
(XIV)

in formulae (X) to (XIV), for example, R⁸, R⁹ signify hydrogen, $C_1$–$C_6$-alkyl; phenyl which is unsubstituted or substituted by halogen, such as chlorine and bromine, $C_1$–$C_6$-alkyl, $C_1$–$C_6$-alkoxy or nitro, and α- and β-naphthyl;

R¹⁰ signifies $C_1$–$C_6$-alkyl, preferably methyl; amino; $C_1$–$C_6$-alkylcarbonyl; carbamoyl, $C_1$–$C_6$-alkoxycarbonyl;

R¹¹ signifies $C_1$–$C_6$-alkyl, preferably methyl, halogen, preferably chlorine, nitro;

p signifies 0, 1 or 2;

Z signifies O or S;

R¹² signifies hydrogen or $C_1$–$C_6$-alkyl, preferably methyl;

R¹³ signifies halogen, preferably chlorine; nitro q signifies 0, 1, 2, 3 or 4.

If Y in formulae (II) and (III) represents a radical of an amine, it is preferably an amine of the formula (XV)

R¹⁴—NH₂     (XV)

in which

R¹⁴ represents a phenyl radical which is unsubstituted or at most trisubstituted by halogen, such as chlorine and bromine, nitro, cyano, carbamoyl, trifluoromethyl, phthalimidyl, $C_1$–$C_6$-alkylcarbonylamino, preferably acetylamino, benzoylamino, which in turn can be further substituted by chlorine, $C_1$–$C_6$-alkyl, preferably methyl, or nitro, or represents α- or β-naphthyl or a radical of the formulae

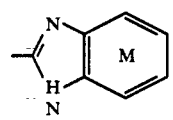
(XVI)

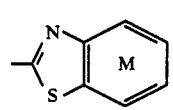
(XVII)

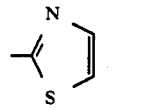
(XVIII)

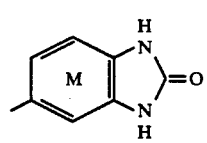
(XIX)

in which

M has the abovementioned meaning. Suitable hydrazine radicals Y in formulae (II) and (III) are preferably derived from hydrazines of the formula

R¹⁴—NH—NH₂     (XX)

in which

R¹⁴ has the abovementioned meaning.

Y in formulae (II) and (III) furthermore represents a hydrazide of the formula (XXI)

R¹⁵—CONHNH₂     (XXI)

in which

R¹⁵ signifies $C_1$–$C_6$-alkyl; an aryl radical, for example phenyl which is unsubstituted or substituted by halogen, such as chlorine, bromine, nitro, cyano, carbamoyl, $C_1$–$C_6$-alkylcarbonylamino, preferably acetylamino, benzoylamino, phthalimidyl or signifies a hetaryl radical, for example of the formulae (VI) to (IX).

Finally Y can be derived from a hydrazone of the formula (XXII)

in which $R^{16}$ preferably represents hydrogen or $C_1$–$C_6$-alkyl and $R^{17}$ preferably represents phenyl which is unsubstituted or substituted by chlorine, nitro, $C_1$–$C_6$-alkyl, $C_1$–$C_6$-alkylcarbonylamino, preferably acetylamino, $C_1$–$C_6$-alkylcarbonyl, preferably acetyl, phthalimdyl, cyano, carbamoyl or trifluoromethyl or represents a heterocyclic radical of the formula (XXIII)

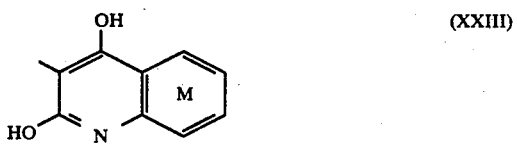

in which

M has the abovementioned meaning or represents a radical of the formula (XXIIIa)

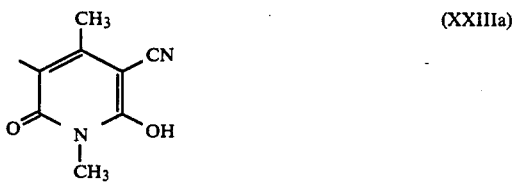

The preparation of the metal complexes according to the invention can be carried out by several processes:

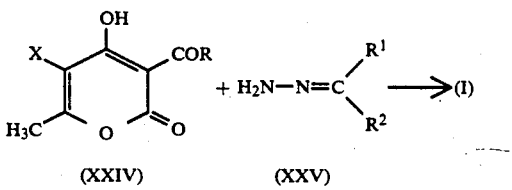

A. Condensation of compounds of the formula (XXIV) with hydrazones (XXV) produces ligands (I), which can then be further reacted with metals to give metal complexes.

B. Ligands of the formula (I) are also accessible by reaction of the hydrazones (XVI) with compounds of the formula (XXVII).

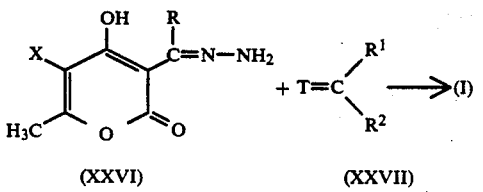

In formulae (XXIV) to (XXVII), R, $R^1$, $R^2$ and X have the abovementioned meaning and T in formula (XXVII) represents O or NZ, where Z signifies substituted or unsubstituted phenyl.

C. Moreover, ligands (I) can be prepared from compound (XXIV) and (XXVII) by reaction with hydrazine, in which the resulting hydrazones (XXV) and/or (XXVI) are condensed further in situ.

The reactions are expediently carried out in an solvent, if necessary with the addition of an acid, at temperatures from 0° to 150° C., preferably between 20° and 150° C.

Suitable organic solvents are alcohols such as methanol, ethanol, amyl alcohol or glycol monoalkyl ether; aromatics such as chlorobenzene, nitrobenzene, toluene; amidic solvents such as formamide, dimethylformamide, N-methylpyrrolidone; or acids such as formic acid or acetic acid.

Suitable acids are inorganic acids such as hydrochloric acid, sulphuric acid or phosphoric acid, or organic acids such as formic acid, acetic acid, chloroacetic acid, dichloroacetic acid, oxalic acid, benzenesulphonic acid or p-toluenesulphonic acid.

The metal complexes can be prepared from the azines of the formula (I), on the one hand, by isolating the ligand and complexing it separately with metal salts. This reaction is carried out, for example, in one of the abovementioned solvents or in water, if necessary with the addition of customary dispersions, at temperatures between 50° and 150° C.

Suitable metal salts are preferably acetate, formate, chloride and sulphate.

Alternatively, after its synthesis, the ligand can be reacted without isolation under the abovementioned conditions directly with the metal salt to give the complex.

Finally it is possible to carry out the synthesis of the ligand by processes A, B or C already in the presence of the metal.

Some of the metal complexes of the azines of the formula (I) exist in several crystalline modifiers, which can be obtained by heat treatment at elevated temperatures or by conditioning processes.

The metal complexes according to the invention are suitable for use as organic pigments.

Thus, they can be used for the preparation of pigmented systems having very good fastness properties, such as mixtures with other substances, formulations, surface coatings, printing inks, colored paper and colored macromolecular substances. Mixtures with other substances can be understood to mean, for example, those with inorganic white pigments such as titanium dioxide (rutile). Formulations are, for example, flush pastes with organic liquids and, if appropriate, preservatives. The name surface coating represents, for example, physically or oxidatively drying lacquers, stoving enamels, reactive lacquers, two-component lacquers, emulsion paints for weather-proof coatings and distempers. Printing inks are understood to mean those for paper, textile and tinplate printing. The novel pigments are in particular suitable for pigmenting macromolecular organic substances.

The macromolecular substances can be of natural origin, such as rubber, obtained by chemical modification, such as acetyl cellulose, cellulose butyrate or viscose or produced synthetically, such as polymers, polyaddition products and polycondensation products. Examples are plastics such as polyvinyl chloride, polyvinyl acetate, polyvinyl propionate, polyolefins, for example polyethylene or polyamides, superpolyamides, polymers and mixed polymers from acrylic esters, methacrylic esters, acrylamide, butadiene, styrene and also polyurethanes and polycarbonates. The substances pigmented with the claimed pigments can be present in any desired form.

Due to their high transparency and weatherproofness, the pigments according to the invention are particularly suitable for use in automotive paints, in particular for metallic coatings.

The pigments according to the invention are highly resistant to water, oil, acid, lime, alkalis, solvents, fast to over-lacquering, fast to overspraying, fast to sublimation, heat-resistant, resistant to vulcanization, give very good yields, are easily processible in plastic materials and in particular highly fast to weathering, lightfast and fast to migration.

EXAMPLE 1 a) 5.2 g of 1-hydrazino-3-(cyano-N-phenylcarbamoyl-methylene)isoindolenine and 4 g of 3-anilinomethylene-4-hydroxy-6-methylpyran-2-one (prepared from 4-hydroxy-6-methylpyran-2-one with trimethyl orthoformate and aniline) are dissolved in 100 ml of dimethylformamide and stirred at 70° C. until the reaction is completed. 4.3 g of nickel acetate are then added, the mixture is stirred at 110° C. for one hour, and the product is filtered off with suction while hot. 6 g (71%) of the reddish yellow pigment of the formula

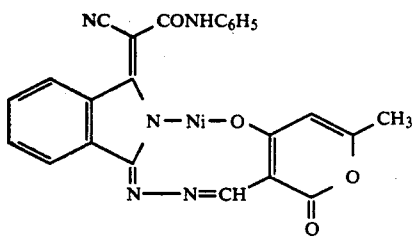

are obtained.

UV in pyridine ($\lambda_{max}$, $\epsilon$): 482 nm (32 000), 514 nm (24 500).

b) A pigment of the same structure having similar colouristic properties is obtained in similar yield by reacting equimolar amounts of 1-amino-3-(cyano-N-phenyl-carbamoylmethylene)isoindolenine and 4-hydroxy-6-methylpyran-2-one-3-aldehyde hydrazone in DMF and then complexing the product with Ni acetate.

Using the process mentioned in Example 1a) and the corresponding isoindole compounds, pigments of the formula

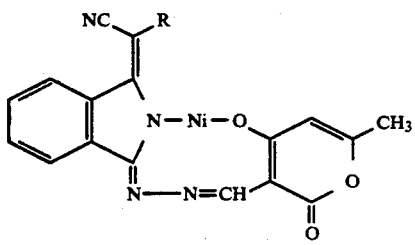

having the meanings for R given in the table and the particular hues are obtained.

| Example No. | R | Hue |
| --- | --- | --- |
| 2 | CONHCH$_3$ | yellow |
| 3 | CONHC$_2$H$_5$ | yellow |
| 4 | CONH—C$_6$H$_4$—Cl (para) | yellow |
| 5 | CONH—C$_6$H$_4$—Cl (meta) | yellow |
| 6 | CONH—C$_6$H$_3$—Cl$_2$ (2,4) | yellow |
| 7 | CONH—naphthyl | orange |
| 8 | CONH—C$_6$H$_4$—CH$_3$ | reddish yellow |
| 9 | CONH—C$_6$H$_4$—OC$_2$H$_5$ | orange |
| 10 | CONH—C$_6$H$_4$—NHCOCH$_3$ | reddish yellow |
| 11 | 2-benzimidazolyl | orange |
| 12 | 4-hydroxy-2-methylquinazolinyl | reddish yellow |

EXAMPLE 13

If in Example 1a) or 1b) nickel acetate is repalced by the corresponding amount of copper acetate, a yellow-brown pigment of the formula

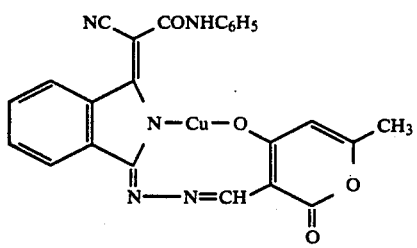

is obtained.

EXAMPLE 14

If in Example 1a) or 1b) nickel acetate is replaced by the corresponding amount of zinc acetate, a yellow pigment of the formula

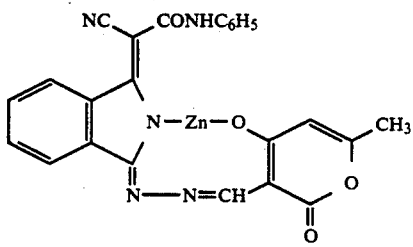

is obtained.

EXAMPLE 15

If in Example 1a) or 1b) nickel acetate is replaced by the corresponding amount of cobalt(II) acetate, a brown-violet pigment of the formula

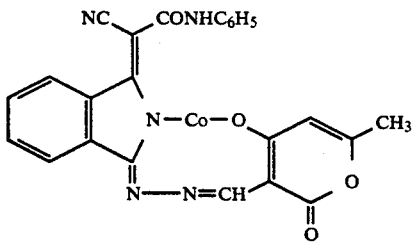

is obtained.

EXAMPLE 16 a) 7 g of 1-hydrazino-3-(cyano-N-phenylcarbamoylmethylene)isoindolenine and 4 g of dehydroacetic acid are reacted in 120 ml of dimethylformamide at 70° C. 5.8 g of Ni acetate is then added, the mixture is stirred at 100° C. for 1 hour, and the product is filtered off with suction and dried to give 8.2 g (70%) of the pigment of the formula

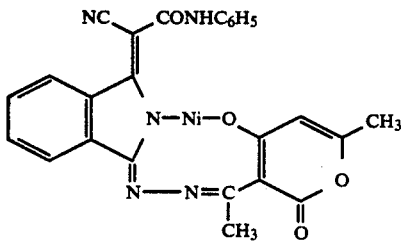

in orange-red needles.

UV in pyridine ($\lambda_{max}$, $\epsilon$): 512 nm (25 000), 481 nm (28 300).

b) A pigment of the same structure is obtained in similar yield and purity by condensing 1-amino-3-(cyano-N-phenylcarbamoylmethylene)isoindolenine and an equimolar amount of dehydroacetic acid hydrazone in DMF and then complexing the product with nickel acetate.

c) 1.1 ml of hydrazine hydrate are added to 6.7 g of 1-amino-3-(cyano-N-phenylcarbamoylmethylene)isoindolenine and 4 g of dehydroacetic acid in 120 ml of dimethylformamide at 0°-5° C. and, after 1 hour at 0° C., the mixture is reacted at 50° C. for 8 hours. 5.8 g of Ni acetate are then added and, after 1 hour at 100° C., the product is isolated.

The pigment mentioned in Example 16a) is obtained in the form of orange-red needles.

d) 12 g of 1-hydrazino-3-(cyano-N-phenylcarbamoylethylene)isoindolenine and 7 g of dehydroacetic acid are stirred in 100 ml of dimethylformamide at 70° C. for 3 hours. The mixture is then cooled to room temperature and filtered off with suction. 10 g (56%) of a compound of the formula

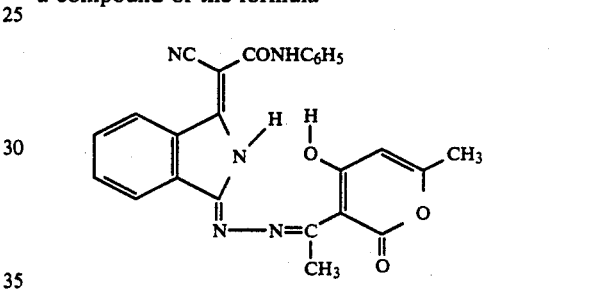

is obtained.

Melting point: 251° C.

5 g of this compound are stirred with 2.8 g of nickel acetate in 100 ml of dimethylformamide at 0° C. for 1 hour. The product is filtered off with suction at room temperature, washed with DMF, methanol and water to give, after drying, 5.1 g (90%) of the Ni complex.

The complex formation can also be carried out with similar results in glacial acetic acid, ethanol, glycol monoethyl ether, water with the addition of 2% monopole oil (surfactant based on sulphonated castor oil), n-butanol or N-methylpyrrolidone instead of dimethylformamide.

EXAMPLE 17

The procedure of Example 16a) is repeated, using 5.9 g of 5-bromodehydroacetic acid instead of dehydroacetic acid to give analogously an orange pigment of the formula

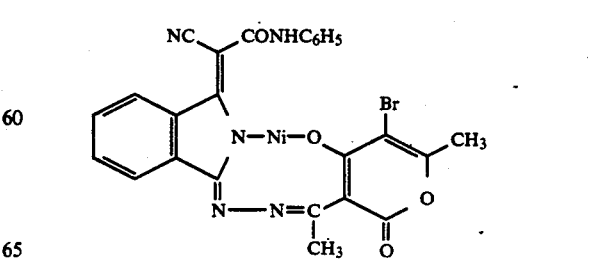

UV in pyridine ($\lambda_{max}$, $\epsilon$); 483 nm (28 700), 512 nm (25 000).

The procedure of Example 16a) is repeated, using various substituted isoindoles to give pigments of the formula

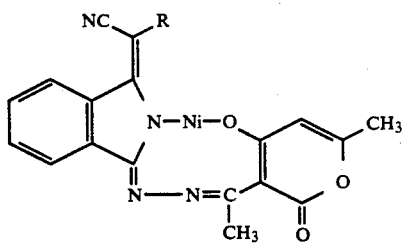

having the meanings for R mentioned in the table below and the hues mentioned.

| Example No. | R | Hue |
|---|---|---|
| 18 | CONH—C6H4—Cl (para) | reddish yellow |
| 19 | CONH—C6H4—Cl (meta) | orange |
| 20 | CONH—C6H3—Cl2 (3,4) | orange |
| 21 | CONH—C6H4—Cl (ortho) | orange |
| 22 | CONH—C6H4—CH3 (ortho) | red-orange |
| 23 | CONH—C6H4—CH3 (para) | red |
| 24 | CONH—C6H4—OC2H5 | red |
| 25 | CONH—C6H4—NHCOCH3 | bluish red |
| 26 | CONH—C6H4—CONH2 | yellow-brown |
| 27 | CONH—C6H4—NHCOC6H5 | red |
| 28 | CONH—C6H3(Cl)(CH3) | yellowish red |
| 29 | CONH—C6H3(NHCOCH3)(CH3) | red |
| 30 | CONH—naphthyl | orange |
| 31 | CONH—C6H4—NO2 | yellow |
| 32 | CONH—C6H4—CN | yellow |
| 33 | CONH—C6H4—SO2CH3 | yellow |
| 34 | 2-methylbenzimidazolyl | red |
| 35 | 4-hydroxyquinazolinyl | red |
| 36 | CN | yellow |
| 37 | COOCH3 | yellow |

EXAMPLE 38

10 g of an isoindolylhydrazone of the formula

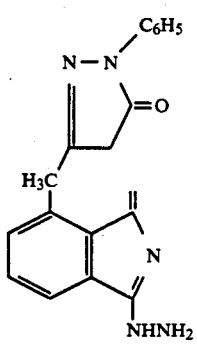

and 5.3 g of dehydroacetic acid are added to 120 ml of DMF. The mixture is stirred at 70° C. until the reaction is completed, 7.8 g of nickel acetate are then added and the product is complexed at 110° C. It is filtered off with suction and dried to give a bluish red pigment of the formula

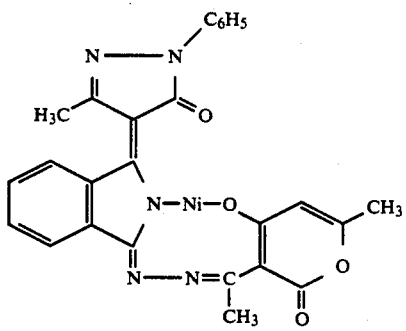

Using the process described in Example 38 and suitably substituted starting materials, pigments of the structure

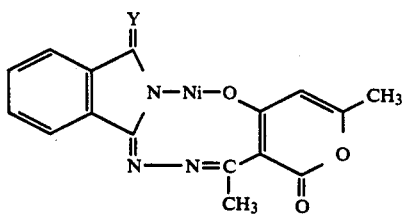

having the meanings for Y mentioned in the table below and the hues mentioned are obtained.

| Example No. | Y | Hue |
|---|---|---|
| 39 | ![2,5-dichlorophenyl pyrazolone] | red |
| 40 | ![4-methylphenyl pyrazolone] | bluish red |
| 41 | ![amino phenyl pyrazolone] | red |
| 42 | ![carbamoyl phenyl pyrazolone] | red |
| 43 | ![barbituric acid] | brown-yellow |
| 44 | ![N-methyl barbituric acid] | brown-yellow |
| 45 | ![rhodanine] | grey-violet |
| 46 | ![quinolinedione] | orange |
| 47 | ![N-methyl quinolinedione] | orange |
| 48 | ![dibromo quinolinedione] | orange |

| Example No. | Y | Hue |
|---|---|---|
| 49 | 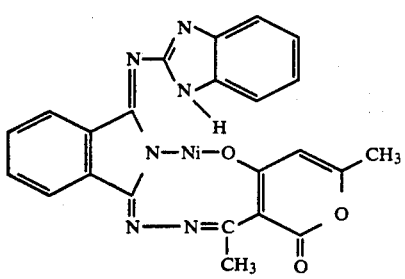 | yellow |

EXAMPLE 50

6 g of dehydroacetic acid hydrazone are reacted with 9.4 g of 1-amino-3-benzimidazolyliminoisoindolenine in 100 ml of DMF at 70° C., 8.9 g of nickel acetate are added to the mixture, which is stirred at 120° C. for 1 hour. The product is filtered off with suction and dried to give 6.9 g (43%) of a reddish yellow pigment of the formula Nickel analysis 12.2% (calculated 12.16%) UV in pyridine ($\lambda_{max}$, $\epsilon$): 341/nm (23 500), 440 nm, (18 500).

Using the process of Example 50 and suitably substituted isoindoles, pigments of the structure having the meaning for R given in the table below and the particular hues are obtained.

| Example No. | R | Hue |
|---|---|---|
| 51 | 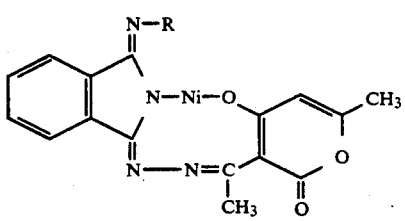 | yellow |
| 52 | | yellow |
| 53 | 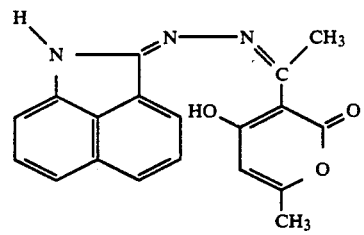 | yellow |
| 54 | | yellow |
| 55 | | yellow |
| 56 | —NHCOC$_6$H$_5$ | yellow |
| 57 | | red |

EXAMPLE 58

20 g of naphtholactam hydrazone and 18 g of dehydroacetic acid are boiled in 200 ml of glacial acetic acid for 90 minutes. The product is filtered off with suction, washed with ethanol and dried to give a compound of the structure 6.6 g of this compound are stirred with 4.0 g of copper acetate in 100 ml of DMF at 80° C. for 2 hours, and then at 140° C. for 2 hours. The product is isolated while hot to give, after washing and drying, a blue-violet pigment of the structure

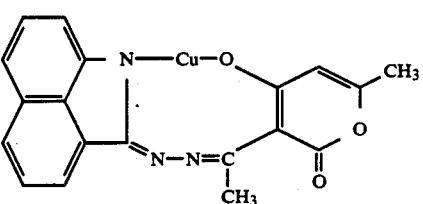

UV in N-methylpyrrolidone ($\lambda_{max}$) 558 and 613 nm.

The procedure of Example 58 is repeated, except that instead of copper acetate the acetate of the metals mentioned in the table below are used, to give the corresponding pigments having the hues mentioned.

| Example No. | Metal | Hue |
| --- | --- | --- |
| 59 | Zn | red |
| 60 | Ni | grey-violet |
| 61 | Co (II) | grey-violet |

EXAMPLE 62

The procedure of Example 59 is repeated, except that dehydroacetic acid is replaced by the equivalent amount of 3-anilinomethylene-4-hydroxy-6-methylpyran-2-one to give an orange-brown nickel complex of the formula

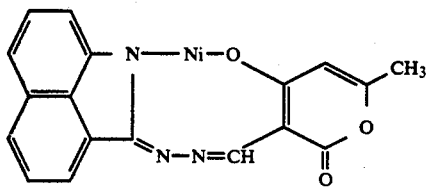

In accordance with Example 26, pigments of the structure

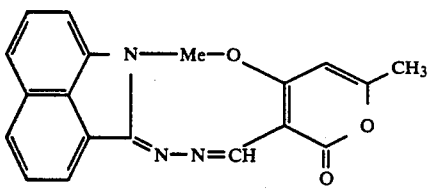

having the hues mentioned in the table are obtained, if nickel acetate is replaced by the acetates of the metals mentioned in the table below.

| Example No. | Metal | Hue |
| --- | --- | --- |
| 63 | Co | blue-violet |
| 64 | Cu | brown |
| 65 | Zn | orange-red |

EXAMPLE 66

33 g of 2-hydrazinobenzothiazole and 33.6 g of dehydroacetic acid are stirred in 250 ml of glacial acetic acid at the reflux temperature for 5 hours. The cold product is filtered off with suction and washed with ethanol to give a compound of the structure

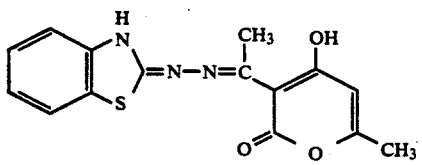

9.5g of this compound are stirred with 6.0 g of copper acetate in 100 ml of dimethylformamide at 120° C. for 2 hours. The product is filtered off with suction while hot and washed with DMF and ethanol. In this manner, the copper complex of the abovementioned compound is obtained as a grey-brown powder.

EXAMPLE 67 (WORKING EXAMPLE)

8 g of a finely ground powder according to Example 16a) are dispersed in 92 g of a stoving enamel of the following composition:
33% of alkyd resin
15% of melamine resin
5% of glycol monomethyl ether
34% of xylene
13% of butanol Suitable alkyd resins are products based on synthetic and vegetable fatty acid such as coconut oil, castor oil, ricinene, linseed oil and the like. Instead of melamine resins, urea resins can be used.

After the dispersion has been carried out, the pigmented lacquer is applied to paper, glass, plastic or metal films and stoved at 130° C. for 30 minutes. The coatings have very good lightfastness and resistance to weathering and good overlacquering fastness.

EXAMPLE 68 (WORKING EXAMPLE)

0.2 g of the pigment of Example 16a) is mixed with 100 g of polyethylene, polypropylene or polystyrene granules. The mixture can be extruded either at 220° to 280° C. directly in an injection-molding machine or in an extruder to give colored rods or on mixing rolls to give colored hides. The rods or fat are, if desired, granulated and extruded in an injection-molding machine.

The orange-colored moldings have very good lightfastness and fastness to migration. In a similar manner, synthetic polyamides made from caprolactam or adipic acid and hexamethylenediamine or the condensation products from terephthalic acid and ethylene glycol can be colored at 280°-300° C., if necessary under a nitrogen atmosphere.

EXAMPLE 69 (WORKING EXAMPLE)

A printing ink prepared by making 35 g of the pigment of Example 16a) and 65 g of linseed oil with the addition of 1 g of siccative (Co-naphthenate, 50% strength in test benzine) into a paste is used to obtain orange-colored offset prints having high brilliance and color strength and very good lightfastness and lacquering fastness properties. Using this printing ink in letterpress, collotype, lithographic or die stamp printing leads to orange-colored prints having similar fastness properties. If the pigment is used for the coloring of tinplate printing inks or intaglio printing inks of low-viscosity or printing inks, orange-colored prints having similar fastness properties are obtained.

We claim:

1. Metal complexes of azines of the formula

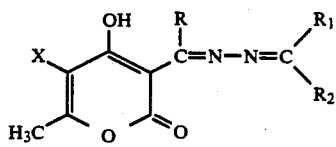

in which
X denotes hydrogen or halogen,
R denotes hydrogen or methyl, and
$R^1$ and $R^2$ together with the carbon atom to which they are bonded form

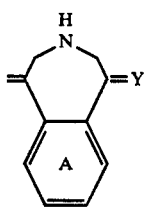

in which ring A is unsubstituted or substituted by 1-4 substituents independently selected from the group consisting of alkyl, alkoxy, alkylthio, halogenoalkyl, hyroxy, halogen, nitro, amino, monoalkylamino, dialkylamino, carboxy, carbalkoxy, sulpho, alkylsulphonyl, and Y denotes an active methylene radical of the formula

in which

R$^6$ denotes a carbamoyl radical of the formula

—CO—NH—R$^7$ where

R$^7$ denotes hydrogen, C$_{1-4}$-alkyl, phenyl, naphthyl, or phenyl or naphthyl substituted by a substituent selected from the group consisting of halogen, NO$_2$, C$_{1-6}$-alkyl, C$_{1-6}$-alkoxy, carbamoyl, N-alkylcarbamoyl, N-phenylcarbamoyl, acetylamido, formaido, phthalimidyl, tetrachlorophthalimidyl, benzoylamido, C$_{1-4}$-alkylsulphonyl, and CN.

2. Zn, Cd, Mn, Co, Fe complexes according to claim 1.

3. Ni and Cu complexes according to claim 1.

4. Metal complexes according to claim 1, in which X in formula I represents H.

5. Metal complexes according to claim 1, wherein R$^7$ is hydrogen, methyl or ethyl.

6. Metal complexes according to claim 1, wherein R$^7$ is phenyl or naphthyl substituted by chlorine, methyl, ethoxy, acetylamino, carbamoyl, benzoylamino, nitro, cyano or methylsulphonyl.

* * * * *

UNITED STATES PATENT AND TRADEMARK OFFICE
CERTIFICATE OF CORRECTION

PATENT NO. : 5,194,626
DATED : March 16, 1993
INVENTOR(S) : Rolf et al.

It is certified that error appears in the above-identified patent and that said Letters Patent is hereby corrected as shown below:

| | |
|---|---|
| Col. 21, line 27 | After " and " insert -- arylsulphonyl, and -- |
| Col. 22, lines 17-18 | Delete " formaido " and substitute -- formamido -- |

Signed and Sealed this

Second Day of August, 1994

Attest:

BRUCE LEHMAN

Attesting Officer        Commissioner of Patents and Trademarks